United States Patent [19]
Noothout

[11] 3,728,421
[45] Apr. 17, 1973

[54] PREPARATION OF METAL OXIDE GRAINS
[75] Inventor: Arend Jaman Noothout, Oosterbeek, Netherlands
[73] Assignee: Reactor Centrum Nederland, The Hague, Netherlands
[22] Filed: Dec. 8, 1970
[21] Appl. No.: 96,282

[30] Foreign Application Priority Data
Dec. 9, 1969 Netherlands ..................6918435

[52] U.S. Cl. ................264/0.5, 23/344, 23/345, 23/349, 23/354, 23/355, 252/301.1 R, 252/301.1 S
[51] Int. Cl. .............................................C09k 3/04
[58] Field of Search.............................252/301.1 S; 264/0.5; 23/345, 349, 354, 355

[56] References Cited

UNITED STATES PATENTS

| 3,312,631 | 4/1967 | Smith I | 252/301.1 |
| 3,312,632 | 4/1967 | Smith II | 252/301.1 |
| 3,384,687 | 5/1968 | Flack | 264/0.5 |

FOREIGN PATENTS OR APPLICATIONS

| 1,169,210 | 10/1969 | Great Britain | 252/301.1 |

Primary Examiner—Carl D. Quarforth
Assistant Examiner—R. L. Tate
Attorney—Cushman, Darby & Cushman

[57] ABSTRACT

A method is disclosed of preparing spherical particles of metal oxide hydrate and metal oxide hydrate with carbon, which particles can be converted into spherical oxide, and if carbon has been incorporated, into carbide particles.

Spherical oxides and carbides of actinide metals are used as fissile material in nuclear technics.

An aqueous solution of a metal salt is mixed at a low temperature with one or more ammonia liberating agents and subsequently solidified by dispersion in a phase of high temperature non-miscible with water, after which the solid substance obtained is separated, washed and subjected to thermal treatment.

10 Claims, No Drawings

PREPARATION OF METAL OXIDE GRAINS

The invention relates to grains, consisting of: metal oxide hydrate, metal oxide hydrate with carbon, metal oxide, metal carbide or metal carbonitride.

In this connection it is known, for instance, to add one or more ammonia-liberating agents to an aqueous solution of a uranyl salt and then to cause this solution, in the form of spherical drops, to solidify by being dispersed in a liquid not miscible with water. The temperature of this liquid should be taken such that rapid solidification of the drops is effected.

As examples of suitable anions of the uranyl salt, the chloride, bromide, nitrate, sulphate, formate and acetate may be mentioned.

Hexamethylenetetramine, acetamide, ammonium carbamate, ammonium cyanate, urea or mixtures of these substances may be mentioned as examples of ammonia-liberating agents.

As examples of a phase non-miscible with water, dehydrating alcohols having four to 10 carbon atoms are suggested.

The solidified drops obtained are separated, washed, and subjected to suitable thermal treatment. Prior to solidification in the phase non-miscible with water, carbon also may optionally be added to the solution. Under suitable thermal treatment, carbides or carbonitrides may in this case be obtained.

However, it is found that the quantity of ammonia-liberating agent which may be added to a uranyl nitrate solution will not suffice to bring about the rapid solidification required. This quantity is in fact restricted by the requirement that premature precipitation of uranium must not occur. The addition of ammonia to the dehydrating liquid was consequently necessary, since it was not possible in any other way to add sufficient ammonia-liberating agent to the salt solution to effect solidification in a satisfactory manner.

It has, however, proved possible according to the method previously mentioned to prepare globules of uranium trioxide hydrate from a uranyl chloride solution. As uranyl chloride is far less easy to obtain commercially than uranyl nitrate, the latter is in principle a much better initial material than uranyl chloride. Traces of chloride in the final product are, moreover, often undesirable.

The invention aims, inter alia, at extending the possible uses of uranyl nitrate as initial material for granular fissile substances. Moreover, improvements may be effected in the preparation of spherical globules from other metal salts than uranyl nitrate.

It has surprisingly been found that a quantity of ammonia-liberating agent sufficient for rapid solidification may be added to the uranyl salt solution provided that the solutions of uranyl salt on the one hand and those of ammonia-liberating agent on the other hand are sufficiently cooled before and after mixing.

By sufficiently cooled is meant here that the temperature will never reach a value at which premature precipitation of uranium occurs. In practice this maximum temperature for the mixed solution is approximately 6°C.

On the other hand, the temperature should not be so low that one of the dissolved substances crystallizes out or that the mixed solution freezes.

In practice this minimum temperature is approximately $-15°C$, viz. $+2°C$ for a solution of 2.16 M uranyl nitrate and lower than $-15°C$ for a solution of 1.7 M uranyl nitrate. It is also surprisingly found that the large quantities of ammonia-liberating agent contained in the solidified drops are no obstacle to the further processing of the material obtained.

It has been found that by the new method the choice of a very specific type of solidification phase has become superfluous. Solidification need not in this case be stimulated by dehydration with an alcohol.

One is therefore free to select practically any type of solidification phase, which is a great additional advantage. One is now able, for instance, to use very cheap paraffinum liquidum.

It was indeed known to evade the difficulties for which the invention provides a solution by the use of dehydrating liquids in which ammonia is dissolved. Moreover, the required quantity of ammonia-liberating agent may be reduced by operating with an anion-deficient metal salt solution.

These processes, however, involve the following drawbacks: restricted choice of liquid non-miscible with water, control of the water content and, possibly of the ammonia content, or the additional stage in the process consisting in the preparation of anion-deficient salt solution.

A highly advantageous excess of ammonia-liberating agent is an excess ranging between 200 percent and 1100 percent of the existing quantity of metal ions. The concentration of uranyl nitrate in the original solution is in this case such that the cooled, mixed solution has a concentration of metal ions between 0.5 and 1.5 mol/l. Mixed solutions with the higher uranium concentrations can be prepared by dissolving uranyl nitrate to saturation point at an elevated temperature and afterwards mixing it, while stirring thoroughly, with a portion of the requisite quantity of cooled concentrated solution of ammonia-liberating agent. The mixture obtained is then further cooled to a temperature below 6°C, after which the remaining portion of the solution of ammonia-liberating agent may be added. The same method is applicable to salts of other actinides.

By selecting suitable gelling liquids of high density it is possible to prepare globules of uranium oxide hydrate of fairly large diameter from the mixed solutions having high uranium concentrations. Thanks to lesser contraction when drying and sintering, due to the higher uranium concentrations, it is possible to prepare fairly large uranium oxide globules from the globules of uranium oxide hydrate obtained.

It has been found possible, when working with the above-mentioned excess and concentrations, to prepare globules of uranium (VI) oxide hydrate which, when in the sintered condition, have a diameter of about 2 mm.

It is possible to prepare nuclear fissile substances on the basis of solutions containing one or more other actinide salts.

It has been found that salts of thorium and plutonium may be used.

The properties shown by grains of nuclear fissile substances prepared according to the above-mentioned methods, may be improved by adding to an actinide salt solution quantities of other metal salts selected from the group of zirconium, hafnium, yttrium or rare earths.

It has been found experimentally that hexamethylene-tetramine, hereinafter called hexa, is to be preferred as an ammonia-liberating agent. The addition of urea may in some cases have an advantageous effect.

A mixed hexa and urea solution was preferably mixed after cooling with a likewise cooled metal salt solution.

Suitable urea and hexa concentrations are those ranging between 1 and 3.5 molar.

The invention is elucidated below in a number of examples.

Example I deals with solidification of a uranyl nitrate solution with a hexa solution.

Examples II, III and IV deal with solidification of a uranyl nitrate solution with a mixed urea and hexa solution.

Examples V and VI relate to the use of thorium, Example VII to the use of plutonium. Examples VIII and IX describe the use of elevated temperatures in the preparation of concentrated, mixed uranyl nitrate solutions.

EXAMPLE I 100 ml of a cooled 2.16-molar uranyl nitrate solution was mixed with 200 ml of a similarly cooled 2-molar hexa solution. The mixture obtained was dripped into a solidification column containing commercial paraffinum liquidum at a temperature of 90°C.

After solidification the drops were drawn off, rinsed with carbon tetrachloride and washed for half an hour with 14-molar ammonia solution.

The washed spheres were dried for one hour by exposure to air and were then sintered in an $H_2$ atmosphere at about 1200°C.

EXAMPLES II AND III 100 ml of cooled uranyl nitrate solutions with concentrations of 1.67 and 2.16 molar respectively were mixed with 200 ml of a cooled mixed solution which was 1.5 molar both in hexa and in urea.

The mixture obtained was afterwards solidified and processed into spheres, according to the methods stated in Example I.

EXAMPLE IV

By mixing certain volumes of cooled solutions of uranyl nitrate, in concentrations between 1.7 and 2.2 molar, with cooled mixed solutions of hexa and urea, each of these two substances in a concentration of 3 molar, their volumes being from 1.7 to 2.0 times that of the uranyl nitrate solutions, it proved possible to obtain large spheres.

The spheres obtained, when in the sintered condition, had a diameter of about 1 mm.

The solidification medium used was paraffinum liquid-um, the method stated in Example I being applied throughout.

EXAMPLE V

First a solution was prepared which was about 2.4-molar in $Th(NO_3)_4$ and which contained 1120 grams of $Th(NO_3)_4 \cdot 4H_2O$ in 840 ml of water.

To 200 ml of this $Th(NO_3)_4$ solution which had subsequently been cooled to a temperature below 10°C, 400 ml of a likewise cooled hexa solution was added in a concentration of 3.7 mol per litre.

After this the mixed solution was solidified into spherical form by dispersion in paraffinum liquidum with a temperature of 80° – 90°C.

After solidification the spheres were washed with ammonia 1 : 9, rewashed with water, dried for 12 hours at 70°C and finally sintered.

EXAMPLE VI

To 100 ml of the cooled $Th(NO_3)_4$ solution described in example V a quantity of 100 ml of a likewise cooled 2.16-molar $UO_2(NO_3)_2$ solution was added. The mixed solution was then mixed with 300 ml of a cooled 3.7-molar hexa solution.

The operation of solidifying and processing to spheres was finally carried out according to the methods stated in Example V.

EXAMPLE VII

To 100 ml of a 2.16-molar $UO_2(NO_3)_2$ solution, a quantity of 11 ml of a 2.24-molar acidified plutonium nitrate solution was added. The mixed solution was then cooled and mixed with 200 ml of a likewise cooled 3.7-molar hexa solution.

The operation of solidifying and processing to spheres was finally carried out according to the methods stated in Example V.

EXAMPLE VIII 1000 grams of $UO_2(NO_3)_2 \cdot 6 H_2O$ was dissolved at about 80°C in its own water of crystallization. Next, after slow cooling in a drying oven having a temperature between 50° and 60°C, there was added to the supersaturated uranyl nitrate solution, cooled to about 60°C while being turned, a quantity of 300 ml of 3 molar solution of both hexa and urea cooled to a temperature of −5° C.

In this way a clear solution was formed, which was subsequently cooled to 0°C. After cooling, a quantity of 900 ml was added, while stirring, of a 3.7 molar hexa solution cooled to a temperature of −5°C. The uranium concentration of the mixed solution was approximately 1.2-molar. The 1.2-molar uranium solution obtained mixed with ammonia-liberating agents, was then dripped into hot perchloro-ethylene ($C_2Cl_4$) of about 80°C, with resulting formation of solidified spheres of uranium oxide hydrate with diameters between 10 and 13 mm. The spheres obtained were washed and then dried.

EXAMPLE IX

In this example all the quantities, concentrations and manipulations were identical with those stated in the previous example, with the exception of the quantity of 3.7-molar hexa solution and the uranium concentration of the mixed solution. The quantity of 3.7-molar hexa solution in this example was 600 ml and the uranium concentration 1.5-molar.

EXAMPLE X

In this example all the quantities, concentrations and manipulations were identical with those stated in Examples II and III, subject to the condition that the uranium solution also contained a quantity of hafnium which was such that the weight ratio of hafnium to uranium was $5 \times 10^{-5}$.

EXAMPLE XI

Same as Example 10, subject to the condition that europium was used instead of hafnium.

I claim:

1. A process for the preparation of grains comprising a metal oxide hydrate or metal oxide including the steps of:
    a. providing an actinide salt solution,
        said actinide metal selected from the group consisting of uranium, thorium, plutonium and mixtures thereof, and the anion thereof is a chloride, bromide, nitrate, sulfate, formate or acetate anion,
        said actinide salt solution cooled to below about 10° C and mixed with an excess of a solution of an ammonia liberating agent also cooled to below about 10° C, the excess ranging between about 200 and about 1100 percent of the quantity of the actinide metal ions present,
        said ammonia liberating agent selected from the group consisting of hexamethylenetetramine, acetamide, ammonium carbamate, ammonium cyanate, ureas and mixtures thereof;
    b. dispersing the mixed solution of step (a) into an organic liquid to solidify the mixed solution
        said organic liquid substantially free from ammonium ions immiscible with water and maintained at an elevated temperature;
    c. separating the thus solidified metal oxide hydrate from the organic liquid;
    d. washing the solid product obtained from step (c); and
    e. drying the solid metal oxide hydrate at an elevated temperature.
2. A process according to claim 1 wherein the temperature of step (a) is maintained between about −15° and +6°C.
3. A process according to claim 1 wherein the concentration of the metal salt in the cooled mixed solution of step (a) is between 0.5 and 1.5 mol/l.
4. A process according to claim 1 wherein step (a) further includes
    i. dissolving an actinide salt in water at elevated temperature to the saturation point,
    ii. adding, with vigorous stirring, a portion of the required cooled solution of ammonia liberating agent to the actinide salt solution,
    iii. cooling the mixed solution of step (ii) to a temperature below about 6° C, and
    iv. adding the remaining portion of the ammonia liberating agent.
5. A process according to claim 1 wherein the actinide metal step (a) is a uranyl nitrate solution containing quantities of at least one metal salt selected from the group consisting of plutonium, thorium, hafnium, zirconium, yttrium and rare earths.
6. A process according to claim 1 wherein the actinide metal of step (a) is a thorium nitrate solution containing quantities of at least one metal salt selected from the group consisting of plutonium, uranium, hafnium, zirconium, yttrium and rare earths.
7. A process according to claim 1 wherein the ammonia liberating agent is hexamethylenetetramine.
8. A process according to claim 7 wherein urea has been added to the hexamethylenetetramine.
9. A process according to claim 7 wherein the hexamethylenetetramine concentration is between about 1 and about 3.5 molar.
10. The process as claimed in claim 1 wherein particles of finely divided carbon are added to the reaction mixture of step (a) and the hydrated product of step (e) is thereafter subjected to the additional steps of:
    g. mild heating to convert the actinide oxide into the corresponding actinide oxide and carbon; and
    h. further heating the actinide oxide with the carbon of step (g) at elevated temperatures to form the corresponding actinide-carbide or actinide carbonitride.

* * * * *